United States Patent [19]
Hohmann et al.

[11] Patent Number: 5,323,811
[45] Date of Patent: Jun. 28, 1994

[54] FLUID COUPLING WITH AUTOMATIC SEALING VALVES

[75] Inventors: Ralf Hohmann; Ralf Spors, both of Bruchköbel, Fed. Rep. of Germany

[73] Assignee: Rasmussen GmbH, Maintal, Fed. Rep. of Germany

[21] Appl. No.: 11,675

[22] Filed: Feb. 1, 1993

[30] Foreign Application Priority Data
Feb. 20, 1992 [DE] Fed. Rep. of Germany ....... 4205142

[51] Int. Cl.⁵ .............................................. F16L 37/28
[52] U.S. Cl. .................... 137/614.04; 251/365
[58] Field of Search ............ 137/614, 614.04, 614.05, 137/614.02, 614.03; 251/149.6, 363, 365

[56] References Cited

U.S. PATENT DOCUMENTS

| | | | |
|---|---|---|---|
| 2,327,611 | 8/1943 | Scheiwer | 251/149.6 X |
| 2,397,265 | 3/1946 | Jacobsson et al. | 137/614.04 X |
| 2,459,477 | 1/1949 | Schuyver | 251/149.6 X |
| 3,336,944 | 8/1967 | Anderson et al. | 137/614.04 |
| 3,525,361 | 8/1970 | Cerbin | 137/614.04 |
| 4,376,526 | 3/1983 | Freeman | 251/328 |
| 4,911,203 | 3/1990 | Garms | 137/614.04 |
| 5,063,965 | 11/1991 | Wilcox | 137/614.04 X |
| 5,113,898 | 5/1992 | White et al. | 137/454.5 |

FOREIGN PATENT DOCUMENTS

| | | |
|---|---|---|
| 3211937 | 11/1982 | Fed. Rep. of Germany . |
| 3310385 | 10/1983 | Fed. Rep. of Germany . |
| 3933589 | 4/1991 | Fed. Rep. of Germany . |
| 1272472 | 11/1958 | France ............... 137/614.04 |
| 1482197 | 8/1977 | United Kingdom . |
| 2150247A | 6/1985 | United Kingdom . |

Primary Examiner—A. Michael Chambers
Assistant Examiner—Kevin L. Lee
Attorney, Agent, or Firm—Darby & Darby

[57] ABSTRACT

A fluid coupling wherein a tubular socket has a first terminal connectable with a first pipe and a section for reception of a section of a tubular plug further having a second terminal connectable with a second pipe. The axial passage of the socket contains a first normally closed valve, and the axial passage of the plug contains a second normally closed valve. The two valves open each other in automatic response to insertion of the plug section into the socket section, and each valve closes in automatic response to extraction of the plug section from the socket section. The seat of each of the two valves is a press fit in the respective passage.

8 Claims, 2 Drawing Sheets

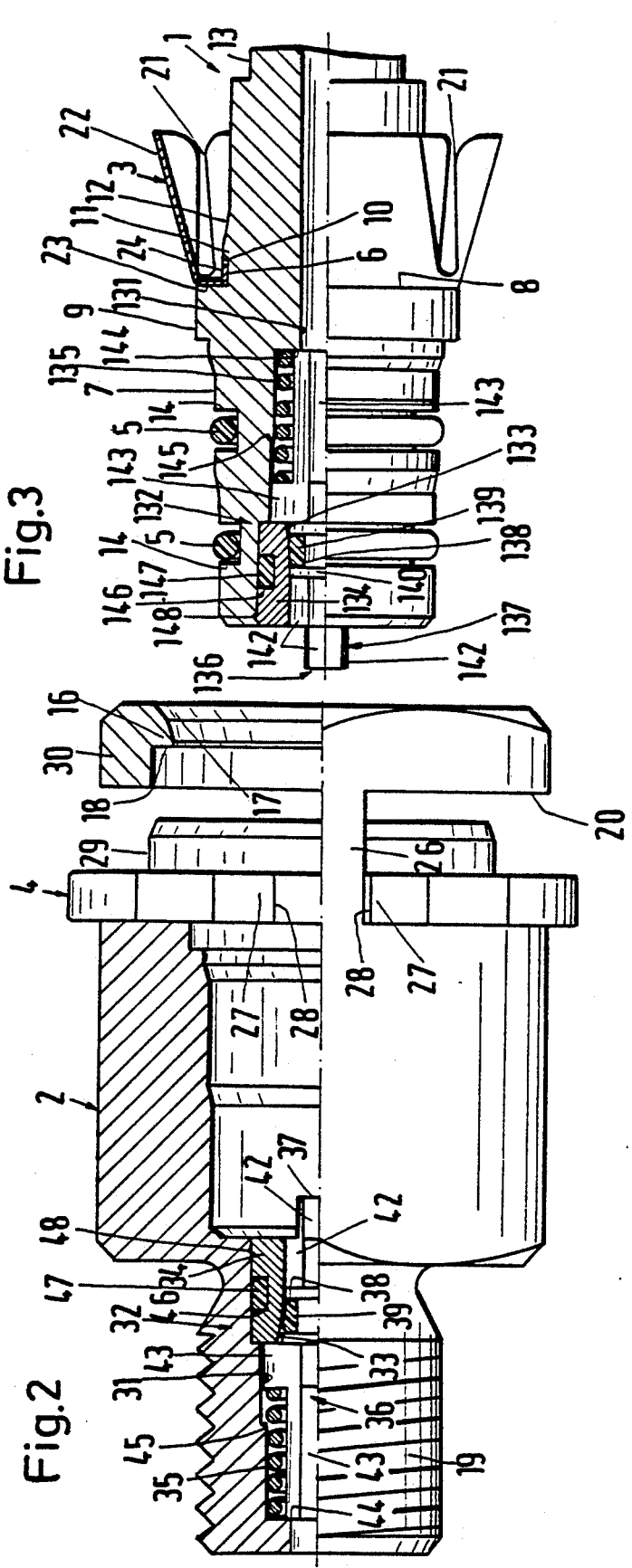
Fig.3
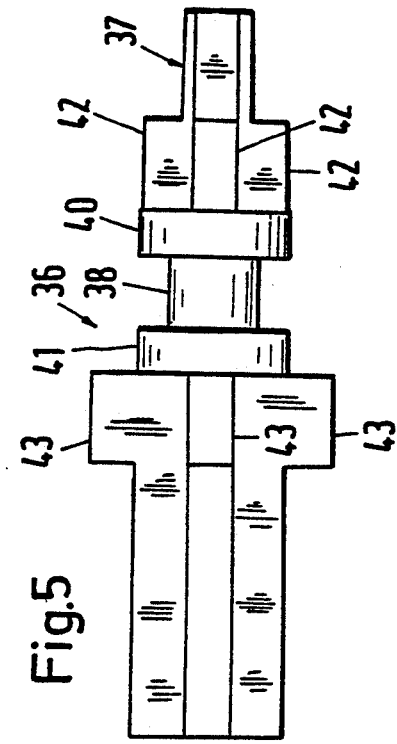
Fig.5
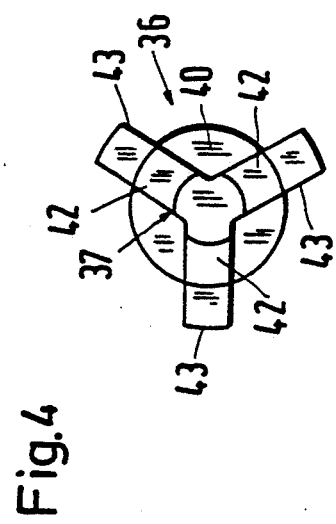
Fig.4
Fig.2

FLUID COUPLING WITH AUTOMATIC SEALING VALVES

BACKGROUND OF THE INVENTION

The invention relates to improvements in fluid couplings in general, and more particularly to improvements in fluid couplings of the type wherein the male and female components can be repeatedly separated from and reattached to each other. Still more particularly, the invention relates to improvements in fluid couplings of the class wherein the separable components are provided with valves which close in response to disengagement of the one component from the other component.

German Pat. No. 33 10 385 C2, granted Aug. 23, 1990 to Bartholomew, discloses a pipe coupling wherein a valve in one of the two separably connectable components closes in automatic response to separation of the components from each other. This prevents the escape of fluid from that component which contains the valve. Such couplings are satisfactory if the direction of fluid flow does not change, e.g., if the fluid always flows from the passage of the male component into the passage of the female component. It is then sufficient to provide a valve in the passage of the male component in order to prevent the fluid from escaping when the male component is disengaged from the female component. Such couplings are unsatisfactory because an appreciable quantity of an expensive, corrosive or other fluid which should not escape into the surrounding atmosphere is free to escape if the fluid flows from the passage of the female component into the passage of the male component. Another drawback of the pipe coupling which is disclosed by Bartholomew is that the valve is rather complex and its installation in the passage of the respective component of the patented coupling involves considerable expenses.

Commonly owned German patent application Ser. No. 39 33 589 A1 of Wachter et al. (published Apr. 18, 1991) discloses a hose coupling wherein neither the male component nor the female component contains a valve. Therefore, such coupling can be taken apart only when the flow of a fluid from the passage of the female component into the passage of the male component, or in the opposite direction, is prevented by means other than valves forming part of or installed in the coupling proper.

German patent application Ser. No. 32 11 937 A1 of Weber et al. (published Nov. 25, 1982) discloses a quick release pipe coupling with two valves, one in the male component and the other in the female component. The two valves are closed when the male and female components are separated from each other. A drawback of the coupling of Weber et al. is that the installation of valves in the respective components, especially in the male component, is a highly complex operation and, therefore, the provision of a valve in the male component contributes significantly to the cost of the patented coupling.

OBJECTS OF THE INVENTION

An object of the invention is to provide a fluid coupling which is constructed and assembled in such a way that the escape of fluid in disengaged condition of the coupling is prevented regardless of whether the fluid flows from the passage of the male component into the passage of the female component or in the opposite direction in assembled condition of the coupling.

Another object of the invention is to provide novel and improved valves for use in the above outlined fluid coupling A further object of the invention is a fluid coupling wherein each valve can be installed in the respective component in a simple and time-saving manner.

An additional object of the invention is to provide novel and improved valve seats for use in the above outlined fluid coupling.

Still another object of the invention is to provide novel and improved valving elements for use in the valves of the above outlined fluid coupling.

A further object of the invention is to provide novel and improved male and female components for use in a fluid coupling of the above outlined character.

Another object of the invention is to provide a fluid coupling which constitutes an improvement over fluid couplings disclosed in the published German patent application Ser. No. 32 11 937 of Weber et al.

An additional object of the invention is to provide a novel and improved method of installing valve seats in the male and/or female components of fluid couplings, particularly in the female and/or male component of a quick-release fluid coupling.

Still another object of the invention is to provide a fluid coupling which is constructed in such a way that its valves are automatically opened to a desired extent in response to completed connection of the female and male components to one another.

A further object of the invention is to provide a pipeline which embodies one or more fluid couplings of the above outlined character.

Another object of the invention is to provide the above outlined fluid coupling with novel and improved means for preventing escape, expulsion or shifting of certain parts of its valves from or in the respective components.

SUMMARY OF THE INVENTION

The invention is embodied in a fluid coupling which can be used to separably connect a first pipe or tube with a second pipe or tube. The improved coupling comprises a tubular socket having a first axial passage and including a first terminal engageable with the first pipe or tube, and a tubular plug having a second axial passage and including a second terminal engageable with the second pipe or tube. The plug further includes a first section which is insertable into and extractible from a second section forming part of the socket, and the sections sealingly engage each other and the two passages communicate with one another in inserted position of the first section. The coupling further comprises means for releasably connecting the first and second sections to each other, and normally closed first and second valves which are respectively provided in the first and second passages to seal the corresponding passages in response to extraction of the first section from the second section. Each valve has a seat in the respective passage, a valving element which is movable with reference to the respective seat between a first position of sealing engagement with the seat and a second position in which the valve permits a fluid to flow through the respective passage, and means for biasing the valving element to the first position. The valving elements engage and move each other to the respective second positions in response to insertion of the first section into the second section to thus permit a fluid to flow from one of the passages into the other passage. At least one of the seats is a press fit in the respective passage.

Each seat is preferably an annular seat. The biasing means of each valve is disposed at one side of the respective valving element and at least one of these valving elements preferably comprises an extension at its other side. The extension engages the other side of the other valving element or an extension of the other valving element in response to insertion of the first section into the second section to thereby stress the two biasing means and maintain the valving elements in their respective second positions.

The extension projects with clearance at least into the seat of the valve including the at least one valving element.

Each seat can be provided with a peripheral recess and can comprise a sealing element in the respective recess. One of these sealing elements is in sealing engagement with the socket in the (first) passage of the socket, and the other sealing element is in sealing engagement with the plug in the (second) passage of the plug.

One of the seats can be disposed in the respective terminal.

At least one of the valving elements can be provided with an annular groove and can include a sealing element which extends into the groove and engages the seat of the respective valve in the first position of the at least one valving element.

At least one of the two seats can include a deformable portion (e.g., an external collar at one axial end of the seat) which is a tight fit in the respective passage.

The socket and/or the plug can include a stop which is disposed in the respective passage to prevent a movement of the respective valving element in a direction from the first position beyond the second position in response to insertion of the first section into the second section. Each stop can include a shoulder in the respective passage.

Each biasing means can comprise at least one spring (e.g., a coil spring) and the socket and/or the plug can comprise a retainer for the respective spring or springs. At least one of the retainers can constitute or include a shoulder in the respective passage.

The first section can be provided with at least one annular sealing element, and/or the second section can be provided with at least one internal sealing element, which engages the other section in response to insertion of the first section into the second section.

At least one of the two passages can include a plurality of preferably coaxial portions having different diameters.

The novel features which are considered as characteristic of the invention are set forth in particular in the appended claims. The improved fluid coupling itself, however, both as to its construction and the mode of assembling and dismantling the same, together with additional features and advantages thereof, will be best understood upon perusal of the following detailed description of certain presently preferred specific embodiments with reference to the accompanying drawings.

BRIEF DESCRIPTION OF THE DRAWINGS

FIG. 2 is a partly elevational and partly axial sectional view of the socket with its valve in closed position as a result of separation of the plug from the socket;

FIG. 3 is a partly elevational and partly axial sectional view of the plug with its valve closed as a result of separation of the plug from the socket;

FIG. 4 is an enlarged end elevational view of the valving element in the valve which is installed in the passage of the socket; and FIG. 5 is a side elevational view of the valving element which is shown in FIG. 4.

DESCRIPTION OF PREFERRED EMBODIMENTS

Figure 1:
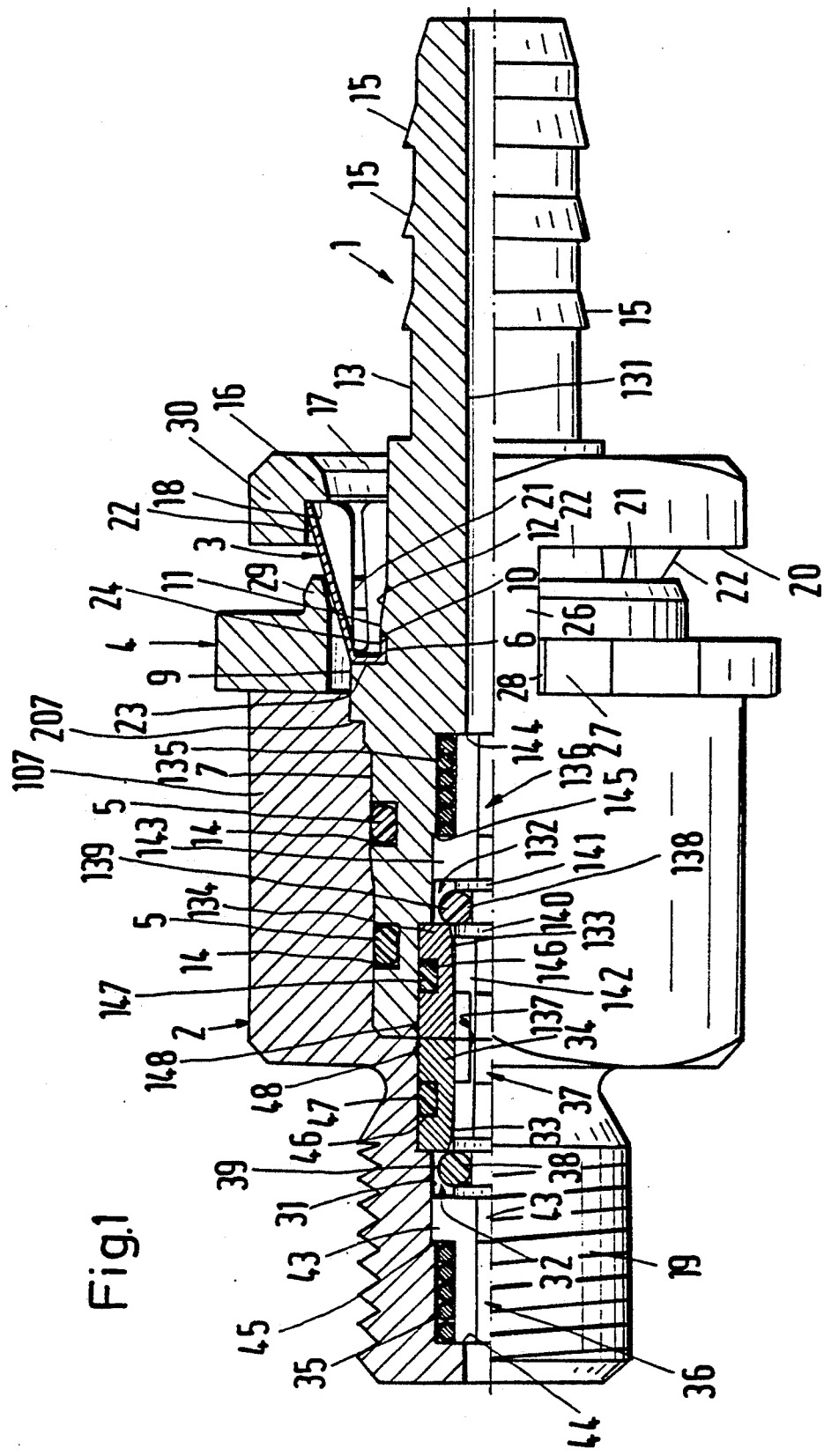
FIG. 1 is a partly elevational and partly axial sectional view of an assembled fluid coupling which embodies one form of the present invention.

Referring first to FIG. 1, there is shown a fully assembled fluid coupling which comprises a first tubular component 1 (hereinafter called plug for short), a second tubular component 2 (hereinafter called socket for short), a resilient ring-shaped member 3 (hereinafter called ring) which separably connects the plug 1 to the socket 2 when an elongated section 7 of the plug is properly inserted into an elongated section 107 of the socket, a reciprocable annular releasing device 4 which can disconnect the arms or prongs 22 of the ring 3 from the socket 2 so that the section 7 of the plug can be extracted from the section 107 of the socket, a first normally closed valve 32 in an axial passage 31 of the socket 2, and a second normally closed valve 132 in an axial passage 131 of the plug 1. The socket 2 and the plug 1 of the illustrated fluid coupling are made of a suitable metallic material, the ring 3 is made of resilient sheet steel, and the releasing device 4 can be made of a metallic material or of a relatively rigid plastic material. Two elastic sealing elements 5 (e.g., in the form of O-rings) are installed in peripheral grooves 14 of the section 7 and sealingly engage the plug 1 as well as the adjacent internal surface of the section 107 of the socket 2 when the improved fluid coupling is fully assembled as shown in FIG. 1.

The peripheral surface of the section 7 of the plug 1 (i.e., of that section which is confined in the section 107 of the socket 2 when the fluid coupling is assembled) is provided with a circumferentially complete groove 6 which is bounded by a radially extending shoulder 8 (see FIG. 3) at one axial end and by a radially extending shoulder 10 at the other axial end. The shoulder 8 is provided at one axial end of a collar 9 which is adjacent the left-hand end of the groove 6, as viewed in FIG. 1 or 3, and the shoulder 10 constitutes a substantially radially extending flank of a circumferentially extending rib 11 having a frustoconical second flank 12 which tapers in a direction from the shoulder or flank 10 toward the axis of the plug 1 and away from the end portion or terminal 19 of the socket 2. The rib 11 is adjacent an end portion or terminal 13 of the plug 1, namely that part of the plug which is not confined or not fully confined in the section 107 when the fluid coupling is assembled. The external surface of the terminal 13 is provided with circumferentially extending ribs 15 having a customary tooth-shaped profile so that the terminal 13 can be readily inserted into but cannot be readily withdrawn from one end portion of a flexible pipe or tube, e.g., a hose of plastic material which conveys a fluid into the passage 131 or receives a fluid stream from such passage. A strap or the like, not shown, can be applied around that end portion of a hose which receives the terminal 13 to further reduce the likelihood of unintentional extraction of this terminal from the hose and/or leakage of fluid around the terminal 13. The terminal 19 of the socket 2 has an external thread so that it can be screwed into a suitable nipple (not shown) or another suitable tube or pipe which is to receive a fluid from, or which is to deliver a fluid stream into, the passage 31. At least a portion of the section 107 has a polygonal (e.g., hexagonal) profile to facilitate the application of a wrench or another suitable tool which is used to move the terminal 19 into mesh with or to disengage this terminal from an internally threaded tube or pipe.

That end portion (30) of the section 107 which is remotest from the terminal 19 is provided with a circumferentially complete internal rib 16 having a radial flank 18 at one end and a frustoconical internal surface or flank 17 which tapers outwardly in a direction away from the flank 18 and away from the axis of the socket 2. The tips of prongs 22 forming part of the ring 3 abut the radial flank 18 when the section 7 is properly received in the section 107. The section 107 is further provided with two circumferentially extending windows 20 in the form of slots which alternate with axially parallel webs 26 serving to connect the end portion 30 with the main portion of the section 107. The windows 20 are disposed diametrically opposite each other.

The configuration of the ring 3 in unstressed condition of its prongs 22 (see FIG. 3) is such that the prongs extend radially outwardly in a direction from a radially extending washer-like intermediate portion 23 away from the axis of the plug 1 and away from the collar 9. The prongs 22 are separated from each other by slots 21 and are flexibly joined to the radially outermost part of the intermediate portion 23. The latter is of one piece with a short cylindrical portion 24 which is received in the groove 6 and is held against axial displacement by the shoulders 8 and 10. The cylindrical portion 24 is slotted so that it constitutes a split ring or such cylindrical portion is expandable so that it can ride over the frustoconical flank 12 of the rib 11 in order to locate the ring 3 in the axial position of FIG. 1 or 3.

The annular releasing device 4 has an internal surface with a diameter which is slightly smaller than the smallest diameter of the rib 16. The device 4 has an oval or elongated polygonal outline so that its two end portions extend radially outwardly beyond the slot-shaped windows 20 in the section 107. This device can be inserted into the section 107 when the latter is disengaged from the section 7; at such time, the device 4 enters the section 107 by way of one of the windows 20 and is brought to a halt when its end portions extend radially outwardly beyond the two windows 20 in the section 107. The minor axis of the preferably elliptical outline of the releasing device 4 is normal to the axis of an imaginary cylinder including the webs 26 which alternate with the windows 20.

The longitudinally extending portions of the external peripheral surface of the releasing device 4 are provided with substantially sawtooth-shaped projections 27 having radially extending flanks 28. Two such flanks 28 engage the adjacent axially parallel sides of the respective web 26 to locate the releasing device 4 in the position of FIG. 1 or 2 (as seen radially of the axis of the socket 2). The device 4 and/or the webs 26 undergo a certain deformation during insertion of the device 4 into the section 107 of the socket 2; when the inserting step is completed, the device 4 and/or the webs 26 reassume the undeformed state so that each web 26 snaps between two neighboring radially extending ribs 28 to thus hold the device 4 against uncontrolled radial movements but to permit the device 4 to move axially of the section 107 toward and away from the internal rib 16 of the end portion 30. The outwardly extending end portions of the device 4 can be used as handles which are engaged by the fingers of one hand to move the device 4 axially of the section 107 toward or away from the internal rib 16. The releasing device 4 is movable axially of the socket 2 between the retracted or inoperative position of FIGS. 1, 2 and an extended or operative position in which its axial extension 29 abuts the flank 18 of the rib 16 in the end portion 30; at such time, the free ends of the prongs 22 forming part of the ring 3 are depressed radially inwardly beyond the annular internal rib 16 so that the section 7 can be extracted from the section 107 because the ring 3 can pass through the end portion 30. The webs 26 not only connect the end portion 30 with the major part of the section 7 of the plug 1 but also serve as a track for the releasing device 4 to confine this device for movement toward and against the flank 18 or in the opposite direction. The extension 29 of the releasing device 4 is a short circular cylinder having a slightly conical free end to facilitate entry into the end portion 30.

If the plug 1 is to be assembled with the socket 2, the section 7 is simply introduced into the section 107. The free end portions of the prongs 22 forming part of the resilient ring 3 are compelled to move toward the axis of the plug 1 during penetration into and during advancement through the rib 16 because the prongs are then acted upon by the conical flank 17 of the rib 16. Once the free end portions of the prongs 22 reach the end positions of FIG. 1, they are free to move radially outwardly and snap behind the flank 18 in the end portion 30 to thus releasably lock the section 7 in the section 107. At such time, the external collar 9 of the section 7 moves into abutment with an internal shoulder 207 of the section 107 to prevent further penetration of the plug 1 into the socket 2. Thus, the section 7 is then held in the section 107 against axial movement toward as well as away from the terminal 19 of the socket 2. The O-rings 5 are compressed between the adjacent portion of the internal surface of the section 107 and the surfaces bounding the respective grooves 14 to prevent penetration of a fluid from the surrounding area into the passages 31, 131 or in the opposite direction. As can be seen in FIGS. 1, 2 and 3, each of the passages 31, 131 includes a plurality of coaxial portions. This simplifies the installation of the two normally closed valves, namely of the first valve 32 in the passage 31 and of the second valve 132 in the passage 131.

In order to disconnect the plug 1 from the socket 2, the operator in charge simply shifts the releasing device 4 along the webs 26 in a direction toward and into abutment with the end portion 30 of the section 7. If the terminal 19 is screwed into and is thus fixedly held by a nipple, a housing, a tank or a like part, the operator in charge need not grasp the section 107 but merely uses one hand to push the releasing device 4 from the retracted position of FIG. 1 toward and against the end portion 30 to thus move the free end portions of the prongs 22 radially inwardly so that the ring 3 can pass through the annular rib 16 on its way away from the terminal 19. As already mentioned above, the maximum outer diameter of the ring 3, when the extension 29 of the releasing device 4 abuts the flank 18 in the end portion 30, is less than the minimum inner diameter of the rib 16; therefore the entire ring 3 can pass through the end portion 30 in response to a pull upon that end portion of a hose or a like tubular or pipe-like part which surrounds the terminal 13 and is held by the ribs 15 and/or otherwise against separation from the plug 1.

If the terminal 19 of the socket 2 is connected to a flexible or otherwise deformable part, e.g., to one end of a hose wherein the one end carries an internally threaded nipple for the terminal 19, the operator uses one hand to grasp the section 107 and uses the other hand to move the releasing device 4 from the retracted position of FIG. 1 toward engagement with the flank 18 in the end portion 30 so that the section 7 is then ready for extraction from the section 107. Alternatively, the operator can grasp the end portion of a hose around the terminal 13 with one hand and use the other hand to move the releasing device 4 against the flank 18; at such time, a pull upon the end portion of the hose around the terminal 13 suffices to extract the section 7 from the section 107. The hand whose fingers (e.g., the thumb and index finger) are used to move the releasing device 4 from the retracted position can also serve to hold the socket 2 if the latter is connected to one end of a flexible conduit, e.g., a hose. The externally threaded terminal 19 can be replaced with an externally ribbed terminal corresponding to the terminal 13, and the terminal 13 of the plug 1 can be replaced with an equivalent of the externally threaded terminal 19.

The resilient prongs 22 of the ring 3 tend to urge the releasing device 4 back toward the retracted position of FIG. 1 or 2 when the extension 29 abuts the flank 18 and while the section 7 is still maintained in the axial position of FIG. 1. Therefore, it is advisable to urge the releasing device 4 against the end portion 30 until the plug 1 begins to move in a direction to advance the radially inwardly depressed free end portions of the prongs 22 toward and along the conical flank 17 of the rib 16. If the device 4 is then released by a hand of the operator, it is automatically propelled at least partly toward the fully retracted position of FIG. 1 or 2 by the prongs 22 which expand as the plug 1 continues to move in a direction away from the terminal 19 of the socket 2. In fact, the radially outwardly moving free end portions of the prongs 22 can even assist the initial stage of axial movement of the section 7 in a direction out of the section 107, i.e., away from the terminal 19 of the socket 2.

The normally closed valve 32 in the axial passage of the socket 2 is free to remain closed as long as the section 7 is not fully inserted into the section 107. The valve 32 comprises an annular valve seat 34 which is a press fit or tight fit in a predetermined portion of the axial passage 31 and has a ring-shaped surface 33 engageable by a portion of an axially movable valving element 36, for example, of the type shown in detail in FIGS. 4 and 5. The element 36 is permanently biased by a coil spring 35 which reacts against a retainer 44 of the socket 2. The illustrated retainer 44 is a shoulder in that portion of the axial passage 31 which extends through the terminal 19. When the valve 32 is closed, the spring 35 maintains an elastically deformable sealing element 39 (e.g., an O-ring) in a circumferential groove 38 of the valving element 36 in sealing engagement with the surface 33 of the seat 34 as well as in sealing engagement with the surface bounding the groove 38. Therefore, a fluid which enters the passage 31 at the free end of the terminal 19 cannot flow beyond the sealing element 39, i.e., such fluid cannot flow around the valving element 36 and on toward that end of the passage 31 which is defined by the end portion 30 of the section 7. The coil spring 35 reacts against the retainer or shoulder 44 and bears against one side of the valving element 36, namely against that side which faces away from the end portion 30. At the other side of the groove or recess 38, the valving element 36 is provided with an axial extension 37 which extends, with at least some clearance, through and beyond the seat 34 in a direction toward the end portion 30 of the section 107. The extension 37 cooperates with an analogous extension 137 of a valving element 136 forming part of the valve 132 in the passage 131 to automatically open the valve 32 (by moving the sealing element 39 away from engagement with the surface 33 of the seat 34) in response to full insertion of the section 7 into the section 107. This also results in automatic opening of the valve 132 by the extensions 37, 137 so that a fluid is then free to flow from the passage 31 into the passage 131 or in the opposite direction.

The aforementioned annular groove 38 of the valving element 36 is disposed between two coaxial collars 40 and 41 which have or can have identical outer diameters. The collar 40 is of one piece with three elongated wings 42 which are equidistant from each other (as seen in the circumferential direction of the valving element 36) and extend radially outwardly from the extension 37. Each wing 42 has a wider portion adjacent the collar 40 and a narrower portion adjacent the free end of the extension 37. The collar 41 is of one piece with three additional wings 43 which extend radially and axially of the valving element 36. Each wing 43 includes a wider portion adjacent the collar 41 and a narrower portion more distant from the collar 41. The narrower portions of the wings 43 are surrounded by the convolutions of the coil spring 35, and the rightmost convolution of this spring bears against the wider portions of the wings 43 to urge the sealing element 39 toward the surface 33 of the seat 34. The maximum diameter of that star-shaped portion of the valving element 36 which includes the wings 42 equals or approximates the diameter of the collar 40, but the maximum diameter of the star-shaped portion which includes the wings 43 exceeds the diameter of the collar 41. Each wing 43 can be coplanar with one of the wings 42 (see FIGS. 4 and 5). The diameter of that portion of the valving element 36 which includes the narrower portions of the wings 43 can approximate or match the diameter of the collar 41.

Neighboring wings 42 and 43 respectively define substantially V-shaped channels for the flow of a fluid toward, past and beyond the sealing element 39 in the groove 38 when such sealing element is disengaged from the surface 33 of the seat 34. The radially outermost portions of the wings 42 are guided by the internal surface of the seat 34 when the valving element 36 is moved axially, either by the spring 35 or by the extension 137 of the valving element 136 in the valve 132. The radially outermost portions of the wings 43 are guided by the internal surface of the terminal 19, namely by an internal surface having a diameter slightly larger than that of the internal surface immediately adjacent the retainer or shoulder 44; this results in the formation of an annular stop or shoulder 45 serving to arrest the valving element 36 in the fully open position of the valve 32 (see FIG. 1), namely when the section 7 of the plug 1 is properly received in the section 107 of the socket 2.

The valve seat 34 has a circumferential groove 46 for an elastically deformable sealing element 47 (e.g., an O-ring) which sealingly engages the surface surrounding the groove 46 as well as the adjacent portion of the internal surface of the socket 2. As mentioned above, the seat 34 is a press fit or tight fit in the passage 31; to this end, one end portion of the seat 34 is provided with a relatively thin (as measured radially of the seat 34) but relatively wide (as measured axially of this seat) external collar 48 which is or can be provided with a serrated (e.g., sawtooth-shaped) peripheral surface whose serrations undergo deformation in response to forcible insertion of the collar 48 into the adjacent portion of the socket 2 so that the seat 34 is reliably held in an optimum axial position at a predetermined distance from the retainer 44 and stop 45. The properly inserted seat 34 may turn in the socket 2 but should be held against axial movements in the passage 31.

The construction of the normally closed valve 132 in the passage 131 of the plug 1 is or can be practically identical with that of the valve 32. The main difference is that the valve 132 is or can be an exact mirror image of the valve 32 because the valve 132 is called upon to automatically seal the passage 131 against the flow of a fluid from the terminal 13 toward the left-hand end of the section 7 (as viewed in FIG. 1 or 3) when the section 7 is extracted from the section 107. This can be readily seen by looking at FIG. 1 which shows the valves 32, 132 in fully open positions so that a fluid can flow from the terminal 19 into the terminal 13 or in the opposite direction. All such parts of the valve 132 which are identical with or clearly analogous to the corresponding parts of the valve 32 are denoted by similar reference characters plus 100. The section 7 has an internal retainer or shoulder 144 for the adjacent convolution of the valve spring 135, and an internal shoulder or stop 145 for the wider portions of wings 143 on the valving element 136. The extension 137 of the valving element 136 extends with clearance through and beyond the seat 134, at least in the closed position of the valve 132 (see FIG. 3).

When the section 7 is inserted into the section 107, the tip of the extension 137 engages and depresses the extension 37 to thus disengage the sealing element 39 on the valving element 36 from the surface 33 of the seat 34. The valving element 36 moves toward the free end of the terminal 19 until arrested by the stop 45; at such time, the section 7 is only partly received in the section 107, i.e., the prongs 22 are yet to engage the flank 18 in the end portion 30. As the operator continues to push the section 7 into the section 107, while the extension 137 continues to bear against the extension 37, the no longer yieldable extension 37 causes the valving element 136 to move axially relative to the seat 134 so that the valve 132 is fully open not later than when the tips of the prongs 22 snap behind the flank 18 to establish a reliable but separable (by 4) connection between the socket 2 and the plug 1. At such time, the springs 35, 135 store adequate amounts of energy to abruptly close the respective valves in response to shifting of the releasing device 4 against the end portion 30 and following extraction of the section 7 from the section 107. The dimensions of the valving elements 36, 136 are selected in such a way that the wings 43 of the valving element 36 abut the stop 45 in the passage and the wings 143 of the valving element 136 abut the stop 145 in the passage 131 when the establishment of a releasable connection between the socket 2 and plug 1 (by way of the ring 3) is completed.

An advantage of the stop 45 is that it ensures adequate opening of the valve 132 even if the spring 135 is much stronger than the spring 35. This is due to the fact that the stop 45 automatically arrests the valving element 36 when the valve 32 is fully open and at a time when the establishment of a connection between the sections 7, 107 is still in progress; therefore, further penetration of the section 7 into the section 107 necessarily results in axial displacement of the valving element 136 in a direction to open the valve 132 because the extension 37 can no longer yield to the pressure which is exerted by the extension 137 regardless of whether or not one of the springs 35, 135 is stronger than the other.

As already described hereinbefore, the springs 35, 135 are free to automatically propel the respective valving elements 36, 136 back to the sealing positions of FIGS. 2 and 3, respectively, as soon as the extraction of the section 7 from the section 107 is at least nearly completed. This ensures that a fluid which was permitted or caused to flow along the composite path defined by the passages 31, 131 cannot escape into the surrounding area (or that air or another fluid medium cannot penetrate into the passage 31 or 131) when the separable connection between the sections 7, 107 is terminated irrespective of whether the fluid was caused to flow from the passage 31 into the passage 131 or in the opposite direction while the socket 2 was still sealingly connected with the plug 1.

The diameter of successive portions of the passage 31 decreases in a direction from the end portion 30 of the section 107 toward the retainer or shoulder 44 in the terminal 19 of the socket 2. This facilitates insertion of the valve 32 into the appropriate portion of the passage 31. The valve 32 is properly installed when the portion 48 is a tight fit or a press fit in the selected portion of the section 107. Analogously, the inner diameter of the passage 131 decreases stepwise in a direction from the free end of the section 7 toward the retainer or stop 144; this permits convenient insertion of the valve 132 which is properly installed when the portion 148 of the seat 134 is a tight fit or a press fit in the end of the passage 131 at the free end of the section 7. The first step in installation of the valves 32, 132 involves the insertion of the springs 35, 135. Such insertion is followed by insertion of the valving elements 36, 136 and thereupon of the seats 34, 134 with their sealing elements 47, 147.

The pressure of fluid in one of the passages 31, 131 can assist rapid closing of the respective valve. For example, if a pressurized fluid was flowing from the terminal 19 toward the terminal 13 and the section 7 is extracted from the section 107 while the pressure of fluid to the left of the seat 34 (as viewed in FIG. 1) is above atmospheric pressure, such fluid assists the bias of the stressed spring 35 to even more rapidly close the valve 32.

The sealing elements 39, 47 and 139, 147 ensure that the valves 32, 132 furnish a highly reliable sealing action when the sections 7 and 107 are disconnected from each other. These sealing elements prevent leakage of fluid around as well as within the respective seats 34 and 134.

The deformable portions 48, 148 render it possible to rapidly and reliably anchor the respective seat 34, 134 in the corresponding passages 31, 131 and to establish a desirable tight fit which, for convenience, will be called a press fit but can be any other fit which suffices to sealingly maintain the seats in optimum axial positions relative to the socket 2 and the plug 1, respectively.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A fluid coupling comprising: a tubular socket having a first axial passage and including a first terminal; a tubular plug having a second axial passage and including a second terminal, said plug further including a first section which is insertable into and extractable from a second section forming part of said socket, said sections sealingly engaging each other and said passages permitting fluid communication with each in either direction in said first and second axial passages in the inserted position of said first section; means for releasably connecting said sections to each other; and normally closed first and second valves respectively provided in said first and second passages to seal such passages in response to extraction of said first section from said second section, each of said valves having a seat in the respective passage, each of said valves having a valving element movable with reference to the respective seat between a first position of sealing engagement with the seat and a second position in which the valving element permits a fluid to flow through the respective passage in either axial direction, and means for biasing the valving element to the first position, said valving element of said first valve engaging and moving with said valving element of said second valve to the second position in response to insertion of said first section into said second section to thus permit fluid communication from one of said passages into and through the other of said passages, each of said seats being press fit in the respective passage, each of said seats being an annular seat, each of said valving elements having a first side and a second side, said biasing means being disposed at the first sides of the respective valving elements and said valving elements comprising an extension at the second side thereof, said extension engaging the second side of the other of said valving elements in response to insertion of said first section into said second section to thereby stress said biasing means and maintain said valving elements in said second positions thereof, said extension projecting with clearance at least into the seat of the other of said valving elements, each of said seats having a peripheral recess and a sealing element in the respective recess, one of said sealing elements being in sealing engagement with said socket in said first passage and the other of said sealing elements being in sealing engagement with said plug in said second passage, one of said seats being disposed in the respective terminal, each of said valving elements having an annular groove and a sealing element extending into said groove, said sealing element engaging the seat of the respective valve in the first position of said valving element.

2. The fluid coupling of claim 1, wherein each of said seats includes an external collar having a peripheral surface that has a deformable portion, the collar being press fit in the respective passage by deformation of the deformable portion.

3. The fluid coupling of claim 1, wherein at least one of said socket and said plug includes a stop disposed in the respective passage to prevent a movement of the respective valving element in a direction from the first position beyond the second position in response to insertion of said first section into said second section.

4. The fluid coupling of claim 3, wherein said stop includes a shoulder in the respective passage.

5. The fluid coupling of claim 1, wherein each of said biasing means comprises at least one spring and each of said socket and said plug comprises a retainer for the respective at least one spring.

6. The fluid coupling of claim 5, wherein at least one of said retainers comprises a shoulder in the respective passage.

7. The fluid coupling of claim 1, wherein one of said sections includes at least one annular sealing element which engages the other section in response to insertion of said first section into said second section.

8. The fluid coupling of claim 1, wherein at least one of said passages includes a plurality of coaxial portions having different diameters.

* * * * *